United States Patent [19]

Heiba et al.

[11] 3,860,612

[45] Jan. 14, 1975

[54] PREPARATION OF POLYCYCLIC KETONES

[75] Inventors: El Ahmadi I. Heiba, Princeton; Ralph M. Dessau, Highland Park, both of N.J.

[73] Assignee: Mobil Oil Corporation, New York, N.Y.

[22] Filed: Apr. 5, 1972

[21] Appl. No.: 241,380

Related U.S. Application Data

[63] Continuation-in-part of Ser. No. 828,342, May 27, 1969, abandoned, which is a continuation-in-part of Ser. No. 714,447, March 20, 1968, abandoned, and a continuation-in-part of Ser. No. 755,732, Aug. 27, 1968, abandoned, which is a continuation-in-part of Ser. No. 714,447, March 20, 1968.

[52] U.S. Cl... 260/332.3 P, 260/297 B, 260/326.16, 260/346.2 R, 260/448.2 B, 260/482 C, 260/488 CD, 260/581, 260/590, 260/621 H, 260/624 C
[51] Int. Cl. ............................................ C07c 45/00
[58] Field of Search ........... 260/590, 297 B, 326.16, 260/332.3 P, 346.2 R

[56] References Cited
UNITED STATES PATENTS 3,006,976 10/1961 Shaw et al. .................... 260/590 X
3,341,601 9/1967 Mertzweiller .................. 260/590 X

*Primary Examiner*—Leon Zitver
*Assistant Examiner*—Norman P. Morgenstern
*Attorney, Agent, or Firm*—Vincent J. Frilette; Andrew L. Gaboriault

[57] ABSTRACT

This specification discloses a method for the preparation of a polycyclic ketone. The polycyclic ketone has at least two rings. At least one of these rings is an aromatic ring and another of these rings contains, as part of its ring structure, the carbon atom of a keto group. These latter two rings share two carbon atoms as part of their ring structures. In the method, an olefin or an acetylene is reacted with an aromatic ketone. This aromatic ketone has at least one aromatic ring and the aromatic ring has a side chain containing a keto group. The carbon atom on one side of the keto group has at least one hydrogen atom connected thereto and the carbon atom on the other side of the keto group is part of the aromatic ring. The reaction of the olefin or acetylene with the aromatic ketone is carried out in the presence of an ion of manganese, cerium, or vanadium in a higher valent form.

12 Claims, No Drawings

PREPARATION OF POLYCYCLIC KETONES

CROSS REFERENCE TO RELATED APPLICATIONS

This application is a continuation-in-part of our copending application Ser. No. 828,342, filed May 27, 1969 and now abandoned. Application Ser. No. 828,342 is a continuation-in-part of our then copending application Ser. No. 714,447 filed March 20, 1968, but now abandoned and is a continuation-in-part of our copending application Ser. No. 755,732, filed Aug. 27, 1968 and now abandoned. Application Ser. No. 755,732 is a continuation-in-part of application Ser. No. 714,447 filed March 20, 1968.

BACKGROUND OF THE INVENTION

1. Field of the Invention

The field of the invention is a method for the preparation of a polycyclic ketone.

2. Description of the Prior Art

The applicants are not aware of any previously known method for preparing a polycyclic ketone as herein defined from an olefin or acetylene and an aromatic ketone as herein defined in the presence of an ion of manganese, cerium, or vanadium in a higher valent form.

BRIEF SUMMARY OF THE INVENTION

In accordance with the invention, there is provided a method for preparing a polycyclic ketone. The polycyclic ketone has at least two rings. At least one of these rings is an aromatic ring and another of these rings contains, as part of its ring structure, the carbon atom of a keto group. These latter two rings share two carbon atoms as part of their ring structures. In the method, an olefin or an acetylene is reacted with an aromatic ketone. This aromatic ketone has at least one aromatic ring and the aromatic ring has a side chain containing a keto group. The carbon atom on one side of the keto group has at least one hydrogen atom connected thereto and the carbon atom on the other side of the keto group is part of the aromatic ring. The reaction of the olefin or acetylene with the aromatic ketone is carried out in the presence of an ion of manganese, cerium, or vanadium in a higher valent form.

DESCRIPTION OF THE PREFERRED EMBODIMENTS

At the outset, it may be of interest to note that polycyclic ketones in general are useful as intermediates for the production of commercial antioxidants, such as alpha-naphthols and alpha-naphtholamines, and metal deactivators. They are also useful as intermediates for the production of insecticides and chelating agents. Further and more detailed reference to the utility of the polycyclic ketones will be made hereinafter.

The reaction whereby the polycyclic ketones may be prepared can be described in equation form wherein, for purposes of illustration, ethylene will be the olefin, phenyl methyl ketone will be the aromatic ketone, and manganese will be the metal ion. The equations are as follows:

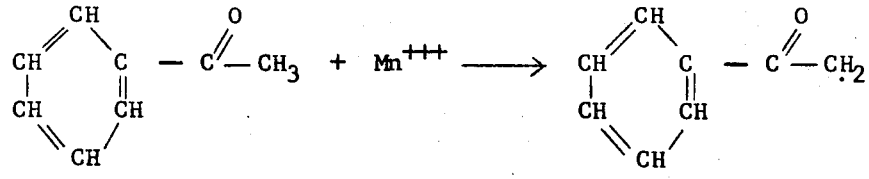

$+ Mn^{++} + H^+$ .     (1)

(In this equation, 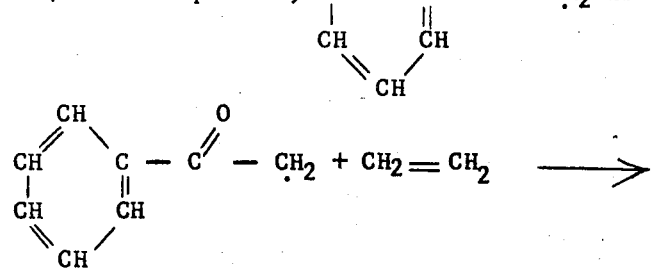 is a free radical.)

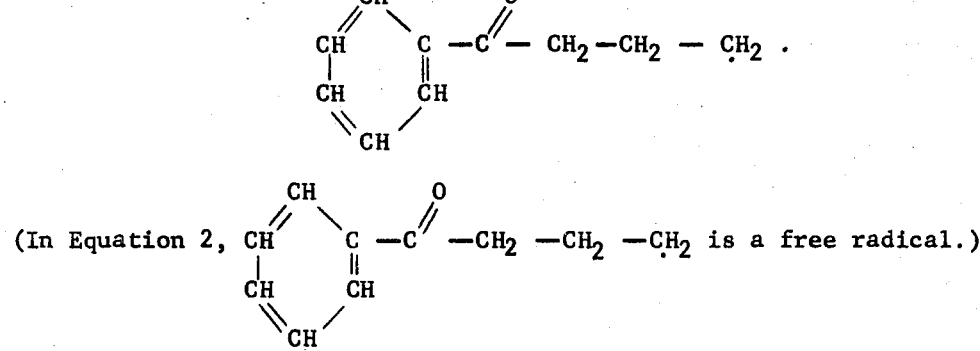

(In Equation 2, the structure shown is a free radical.)

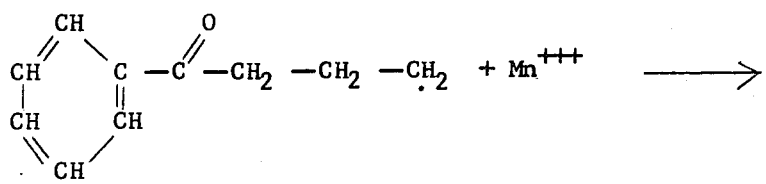 (3)

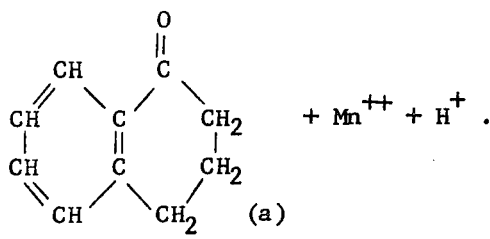 (a)

Thus, the overall reaction is:

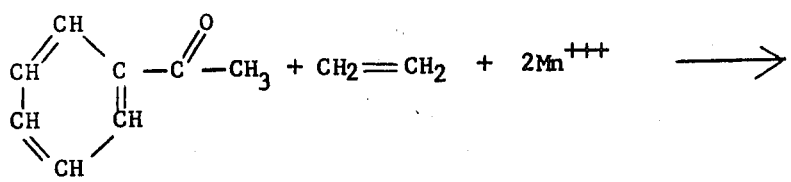

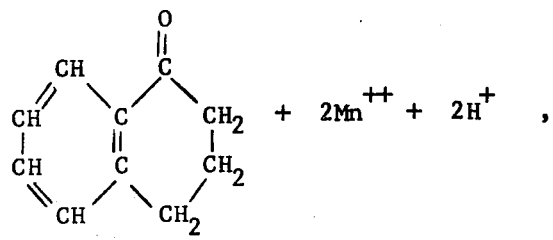 (4)

showing that one mole of aromatic ketone and one mole of olefin in the presence of two moles of manganic ion give one mole of polycyclic ketone, two moles of manganous ion, and two moles of hydrogen ion. As shown in Equation 1, the

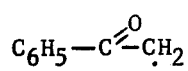

free radical is produced when the manganic ion is reacted with the aromatic ketone. According to the reaction of Equation 2, the reactive species,

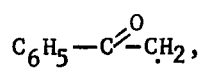

adds to the double bond of the olefin, forming the free radical

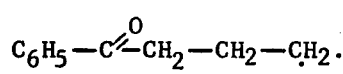

According to the Equation 3, the ketone product of Equation 2 cyclizes.

In the reaction illustrated above, the aromatic ketone is phenyl methyl ketone. This aromatic ketone has at least one aromatic ring, i.e., the benzene ring, and has a side chain containing a keto group, i.e., the side chain being

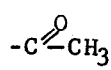

and the keto group being

The carbon atom on one side of the keto group, i.e., the —CH₃, contains at least one hydrogen atom connected to it. The carbon atom on the other side of the keto group, i.e., the $$\begin{matrix}\diagdown\\ C\\ \|\end{matrix}$$

is part of the benzene ring.

Further, in the reaction illustrated above, the product (a) of the reaction is a polycyclic ketone. It has two rings, i.e., the benzene (aromatic) ring on the left side of the product and the cyclohexene ring on the right side of the product. The two carbon atoms, $$\begin{matrix}\diagdown\diagup\\ C\\ \|\\ C\\ \diagup\diagdown\end{matrix}$$

are shared by each of the two rings. Further, the carbon atom of the keto group, the $$\begin{matrix}O\\ \|\\ C\\ \diagup\diagdown\end{matrix}$$

is part of the ring structure of the cyclohexene ring.

Still further, in the reaction illustrated above, the metal ion is manganese and manganese ion can have higher and lower valent forms. In the reaction illustrated, the manganese ion has a valence of 3, i.e., the manganese ion is in a higher valent form. During the reaction, the manganic ion is reduced to manganous ion wherein the manganese ion has a valence of 2, i.e., the manganese ion is in a lower valent form. It will be noted that the manganic ion forms a free radical from the aromatic ketone.

The explanation of the foregoing reaction mechanism is intended only to be illustrative and not limiting.

The olefin employed in the method of the invention may be a monoolefin or may contain two or more double bonds. Preferably, the olefin is a monoolefin containing not more than four carbon atoms. Specifically, ethylene, propylene, the n-butylenes, or isobutylene is preferred. Of these, ethylene is preferred. However, other olefins such as the pentenes, hexenes, heptenes, and octenes may be employed. Olefin oligomers are useful, such as propylene tetramer and isobutylene trimer. Also suitable are open chain, conjugated or unconjugated diolefins having 3 to 8 carbons and including allene, butadiene, isoprene, pentadiene, hexadiene, heptadiene, and diisobutenyl. Also of use are open chain olefins having more than two double bonds, sometimes designated oligoolefins, such as hexatriene.

The acetylene employed in the method of the invention may be a monoacetylene or may contain two or more triple bonds. Acetylenes which may be employed include ethine, allylene, the butynes, pentynes, hexynes, heptynes, and octynes. Hydrocarbons having both double and triple bonds, i.e., compounds which are both olefins and acetylenes, are of value, such as butenyne, 1,6-heptadiene-3-yne and 1,7-octaenyne. Mixtures of olefins and/or aceylenes may be employed. The olefin may also contain a substituent which contains oxygen, a halide, or a metal.

The aromatic ketone employed in the method of the invention has, as stated, at least one aromatic ring, a side chain on the aromatic ring containing a keto group, the carbon atom on one side of the keto group having at least one hydrogen atom connected thereto, and the carbon atom on the other side of the keto group being part of the aromatic ring. The aromatic ring may be a benzene ring, a thiophene ring, a furan ring or a pyrrole ring. The aromatic ketone may be a monocyclic or a bicyclic or other polycyclic ketone. Aromatic ketones such as those illustrated below, and isomers thereof, may be employed.

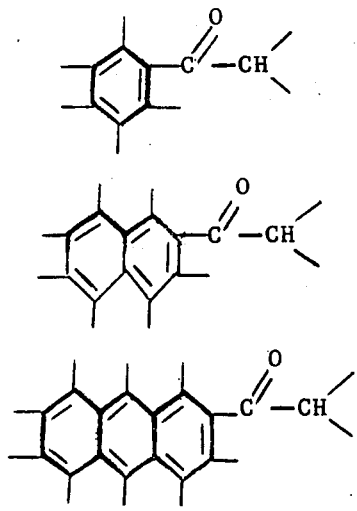

(a)

(b)

(c)

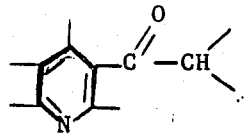

(d)

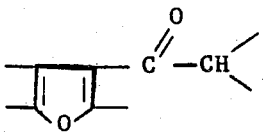

(e)

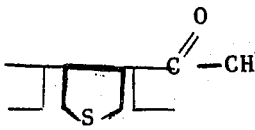

(f)

The dangling valences in the aromatic ketones above may be any suitable radical, such as hydrogen or alkyl, alkenyl, or aryl groups. The alkyl group may be, for example, methyl, ethyl, propyl, butyl, or pentyl groups. The dangling valances on the aromatic ring may be a group such as —OOCR, —OR, and halogen where R is an alkyl group such as those just mentioned.

The reaction of the olefin or acetylene with the aromatic ketone is carried out, also as stated, in the presence of an ion of a metal. The metal is manganese, cerium, or vanadium. Each of these metals forms reducible metal ions having lower or higher valent forms and is capable of existing in either of the two forms. The ion is in higher valent form and, during the reaction, is reduced to a lower valent form and forms a free radical from the aromatic ketone. In their higher valency states, the ions of these metals have a relatively good oxidation potential and, in their lower valency states, tend to be stable and reoxidizable to the higher valency state.

The metal ion in higher valent form may be provided by any compound of the metal that will provide ions of the metal in the reaction mixture. Stated otherwise, it is immaterial what compound provides the metal ions as long as the compound will, in the presence of the olefin, acetylene, or aromatic ketone reactants, or solvent, which will be mentioned in more detail later, provide the metal in ion form. Thus, the metal ion may be provided by the acetates, propionates, butyrates, halides, halogen substituted acetates, -propionates or -butyrates, or other compounds of the metal.

The preferred metal ion for the reaction is trivalent manganese, or manganic ion, $Mn^{+3}$, which, as mentioned previously, is reducible during the reaction to bivalent manganese, or manganous ion, $Mn^{+2}$. As shown by Equations 1 and 3, the $Mn^{+3}$ is a reactant. Manganic acetate dihydrate is a $Mn^{+3}$-producing compound. It may be formed by refluxing an acetic acid solution of manganous acetate with potassium permanganate. Other suitable $Mn^{+3}$-producing compounds or mixtures include anhydrous manganic acetate, manganic propionate, and manganic butyrate; a mixture of activated (i.e., freshly prepared or acid treated) manganese dioxide and acetic acid; a mixture of manganese sesquioxide and acetic acid; and a mixture of $Mn_3O_4$ and acetic acid. They also include a solution of manganese chloride in acetic acid; or manganese fluoride, or manganic hypophosphate dihydrate, or manganic sulfate, or manganic phosphate monohydrate, manganic pyrophosphate, each dissolved in acetic acid or one of the solvents noted below. Other higher valent manganese ions, in solution, may be of use, such as $Mn^{+4}$, as obtained from a mixture of $MnO_2$ and acetic acid; $Mn^{+6}$, as supplied by the manganate of sodium, potassium, ammonium, lithium, magnesium, strontium, calcium, or barium; and $Mn^{+7}$, as supplied by the permanganate of sodium, potassium, ammonium, or magnesium. Whatever higher valent manganese ion-supplying compound is chosen, it should be soluble in the reaction mixture. In addition to the foregoing higher valent manganese ions, it is feasible to employ mixtures of ions, such as $Mn^{+2}$ plus any of $Mn^{+3}$, $Mn^{+4}$, $Mn^{+6}$ or $Mn^{+7}$; or $Mn^{+3}$ plus any of $Mn^{+4}$, $Mn^{+6}$, or $Mn^{+7}$; or $Mn^{+4}$ plus $Mn^{+6}$ or $Mn^{+7}$; or $Mn^{+6}$ plus $Mn^{+7}$. Such mixtures may be supplied by suitable mixtures of the foregoing source compounds. The $Mn^{+2}$ ion may be supplied by any soluble manganous compound, such as the acetate, propionate, nitrate, oxide, hydroxide, chloride, sulfate, phosphate, or perchlorate.

The manganese source compound may be added per se to the reaction mixture, or if desired it may be formed in situ. In situ formation may suitably be performed by adding to the reaction mixture a manganous compound like manganous acetate together with a solvent therefor like acetic acid and also adding an oxidizing agent so that the $Mn^{+2}$ ion is oxidized at least to $Mn^{+3}$ ion. Other manganous compounds include those named in the preceding paragraph, and other solvents include alkali metal acetates and carbonates as well as those described below. Suitable oxidizing agents include nitric acid, potassium permanganate, chlorine, oxygen, air, potassium manganate, cerium ammonium nitrate, cobaltic acetate, various peroxides like peracetic acid and hydrogen peroxide, or intermediate peroxides or hydroperoxides resulting from the air oxidation of hydrocarbons. Electrochemical oxidation is a suitable oxidizing procedure.

The reaction preferably should be carried out in the presence of a solvent. The olefin, acetylene, or aromatic ketone may in themselves act as the solvent. Primarily, the solvent is employed to maintain the metal ion compound in a state of solution. On the other hand, it is not essential that the metal ion compound be in a state of solution since the reaction mixture may be in a heterogeneous phase condition such as where the metal ion compound is in the form of a slurry. Where a solvent additional to the reactants is to be employed, it may be any liquid which is inert with respect to the reaction and has sufficient polarity to effect solution of the metal ion compound. Preferably, acetic acid is employed as the solvent. However, other carboxylic acids, such as propionic, butyric, and pentanoic acids, may be employed. Carboxylic acid esters, nitriles, nitro compounds such as nitromethane, sulfonic acids and sulfonic acid esters may also be employed.

Considering now the conduct of the reaction, the concentration of the olefin or acetylene may range from 0.01 to 5 molar. Preferably, 0.25 to 1 mole of olefin or acetylene per mole of manganic or other higher valent metal ion may be employed. The aromatic ketone is present at least in an amount to provide 1 mole per mole of olefin or acetylene. Preferably, it should be in excess. A solvent, as previously noted, may also be present. The solvent, which may be acetic acid also as previously noted, may be present in an amount sufficient to dissolve the olefin or acetylene, the metal compound, and the aromatic ketone. The reaction is preferably performed at temperatures ranging from about 40° to 100° C. However, higher and lower temperatures may also be used. Temperatures above boiling are of use but, in this case, the reaction is performed under pressure to maintain a liquid phase. Reaction times generally extend from an hour or less to 5 or 10 hours or more. An inert atmosphere, such as one of nitrogen, carbon dioxide, helium, and the like, is desirably maintained over the reaction mixture to avoid oxidation by air.

At the conclusion of the reaction, separation of the product may be effected as by conventional distillation, extraction, fractional crystallization, and the like with or without the aid of conventional filtration or centrifugation. For example, in a reaction mixture containing the product, acetic acid, reduced manganous salt like manganous acetate, and any unreacted unsaturated compound, the mixture may be filtered to remove any solids and then subjected to distillation, using vacuum if necessary to separate the product from other components. Alternatively, the reaction mixture may be mixed with additional quantities of acetic acid sufficient to dissolve all the manganous acetate and the resulting mixture distilled under vacuum to isolate the product; in this case the manganese salt may be found in the column bottoms.

The manganous compound that is formed as a consequence of the reduction of the manganic compound may, as already indicated, be saved and used to regenerate the manganic compound. Thus, where the manganous compound is manganous acetate, it is desirably isolated from the reaction mixture, heated at 200° to 300° C. to form MnO, acetone, and carbon dioxide, and the MnO then heated in air or oxygen to form $MnO_2$, $Mn_2O_3$, and/or $Mn_3O_4$. On dissolving these oxides in acetic acid, there is formed manganic acetate, and this solution is of use to prepare a product in accordance, say, with Equations 1 through 3 above. The acetone, of course, is valuable enough to recover.

Alternatively, the isolated manganous acetate may be dissolved in acetic acid and the solution electrolyzed, using a carbon or other suitable anode, to form manganic acetate, the resulting electrolyzed solution being directly usable in a free radical reaction. Where the manganous acetate is already in solution in acetic acid, no preliminary isolation step is necessary as such solution may be charged to the electrolysis cell and electrolyzed.

Or the isolated manganous acetate may be dissolved in water, the solution buffered to pH 6 to 8 by means of ammonium chloride or other suitable buffer, and air or oxygen passed through the solution to produce manganese sesquioxide. This oxide is filtered and dissolved in acetic acid to form a solution of manganic acetate.

The isolated manganous acetate may also be treated with an oxidizing agent like concentrated or fuming nitric acid plus acetic anhydride to produce anhydrous manganic acetate, which is useful per se in the free radical reaction.

As a further alternative, the manganous acetate, either isolated or in acetic acid solution, may be mixed with acetic acid and with activated $MnO_2$ to form manganic acetate. To obtain activated $MnO_2$, one can freshly prepare this oxide, or can treat an existing sample with a dilute mineral acid following this with water washing and drying.

Manganous acetate can also be oxidized to manganic acetate by treatment with potassium permanganate.

The foregoing regeneration procedures generally apply to other manganous compounds besides the acetate; and with suitable modifications they are applicable to the regeneration of other higher valent metal compounds from lower valent forms thereof. It will be appreciated that the regeneration step permits the manganese compound, or other metal compound, to be used over and over and therefore represents a significant economy.

The following examples will be further illustrative of the invention.

EXAMPLE 1

In this example, phenyl methyl ketone (acetophenone) was reacted with butene-1 to form a tetralone, 4-ethyl-1-tetralone, in accordance with the equation:

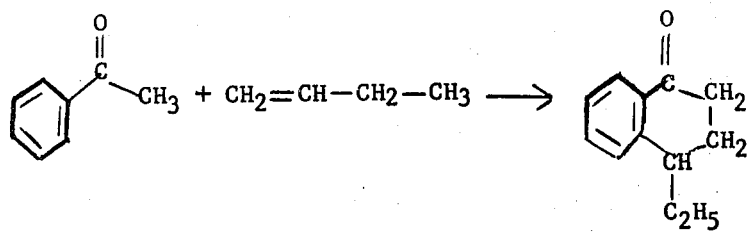

The reaction was carried out by adding 50 milliliters of 0.26 molar manganic acetate dihydrate (Mn(O-COCH$_3$)$_3$·2H$_2$O) in acetic acid, the acetic acid containing dissolved therein 10 percent by weight of potassium acetate, to 20 milliliters of phenyl methyl ketone in an ampule. The ampule was purged with nitrogen to remove air therefrom. Thereafter, butene-1 was bubbled through the mixture in the ampule for 5 minutes. The ampule was sealed and placed in a bath until the reaction was complete. The bath was maintained at 70° C. and the reaction was considered to be complete when the brown color of the manganic ion had disappeared.

EXAMPLE 2

In this example, phenyl methyl ketone was reacted with isobutylene to form a tetralone, 4-dimethyl-1-tetralone, in accordance with the equation:

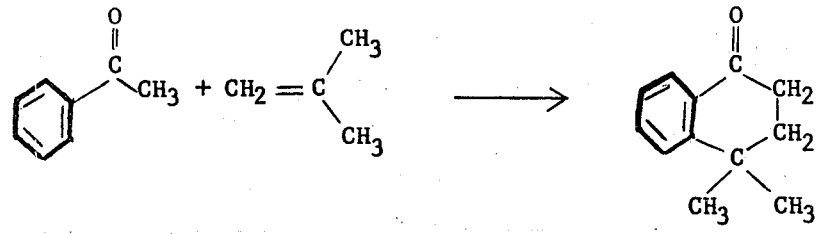

To 361 grams of phenyl methyl ketone in an ampule were added 600 milliliters of acetic acid containing dissolved therein 60 grams of potassium acetate and 50 grams of manganic acetate dihydrate. The ampule was purged with nitrogen and thereafter isobutylene was bubbled through the mixture for 10 minutes. The ampule was sealed and placed in a bath maintained at a temperature of 70° C. The reaction, which required about 2 hours, was considered to be complete with the disappearance of the brown manganic ion color. The yield of the tetralone was about 30 percent and had a boiling point of 120° C. at 2.0 millimeters of mercury.

EXAMPLE 3

In this example, phenyl methyl ketone was reacted with 1-octene to form 4-n-hexyl-1-tetralone in accordance with the equation:

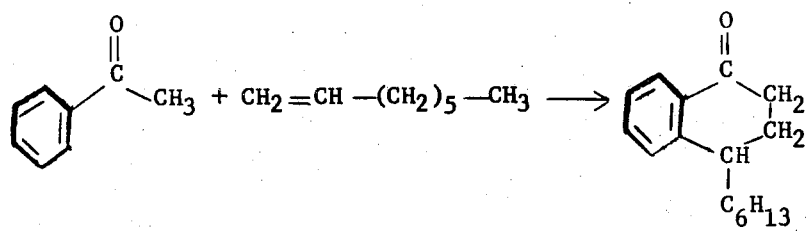

To a 1-liter pyrex bomb were added 5.52 grams (0.0200 mole) of manganic acetate dihydrate, 50 milliliters of acetic acid containing dissolved therein 10 percent by weight of potassium acetate, 72.08 grams (0.600 mole) of phenyl methyl ketone, and 1.68 grams (0.0150 mole) of 1-octene. The bomb was sealed and placed in a bath maintained at 100° C. The reaction was complete after 22 minutes as indicated by the disappearance of the brown color of the manganic ion. The acetic acid was distilled from the reaction mixture on a rotovac. The residue from the distillation was taken up in 250 milliliters of water and extracted successively with 250, 100, and 100 milliliter portions of diethyl ether. The ether extracts were neutralized by extraction with cold aqueous solution containing 10 percent by weight of sodium carbonate. The aqueous base layer was extracted once with diethyl ether. This ether layer was combined with the three ether layers previously obtained and the combined layers dried over magnesium sulfate, filtered and evaporated to give 68.08 grams of the tetralone product. The yield of product was 46 percent.

EXAMPLE 4

In this example, acetylthiophene was reacted with propylene in accordance with the formula:

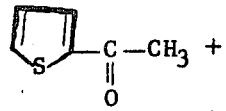 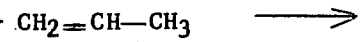 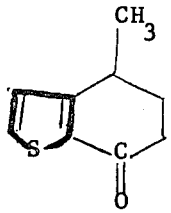

The procedure carried out was the same as that in Example 3. The amounts of reactants, reaction temperature, and yield of product were as follows:

| | | |
|---|---|---|
| Manganic acetate dihydrate | 11.04 grams | (0.0400 mole) |
| Acetylthiophene | 151.42 grams | (1.200 moles) |
| Propylene | 1.26 grams | (0.0300 mole) |
| 10% potassium acetate in acetic acid | 350 milliliters | |
| Reaction temperature | 70° C. | |
| Yield | 35%. | |

EXAMPLE 5

In this example, acetylthiophene was reacted with cis-2-butene in accordance with the formula:

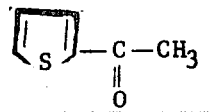  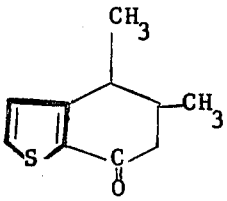

The procedure carried out was the same as that in Example 3. The amounts of reactants, reaction temperature, and yield of product were as follows:

| | | |
|---|---|---|
| Manganic acetate dihydrate | 11.04 grams | (0.0400 mole) |
| Acetylthiophene | 12.62 grams | (0.100 mole) |
| Cis-2-butene | 8.41 grams | (0.150 mole) |
| 10% potassium acetate in acetic acid | 650 milliliters | |
| Reaction temperature | 70° C. | |
| Yield | 43%. | |

EXAMPLES 6 - 10

In these examples, phenyl methyl ketone, phenyl ethyl ketone, and acetylthiophene were reacted with various olefins. The reaction procedure involved heating 0.2 mole of manganic acetate dihydrate, 0.2–0.6 mole of the aromatic ketone, and 0.1–0.2 mole of the olefin in 400 milliliters of acetic acid containing 10% of potassium acetate under nitrogen at 70° C. until the manganic color disappeared (which was about 1 hour). The table gives the example number, ketone, the olefin, the polycyclic ketone product, and the yield. The yields are based on the manganic ion consumed, assuming the requirement of 2 moles of manganic ion per mole of polycyclic ketone.

TABLE I

| Example Number | Ketone | Olefin | Polycyclic Ketone | Yield |
|---|---|---|---|---|
| VI | Phenyl methyl ketone | Butene-2 | | 40% |
| VII | Phenyl methyl ketone | CH₂=CH-Si(CH₃)₃ | | 29% |
| VIII | Phenyl ethyl ketone | Octene-1 | | 29% |

TABLE 1—Continued

| Example Number | Ketone | Olefin | Polycyclic Ketone | Yield |
|---|---|---|---|---|
| IX | Phenyl ethyl ketone | Butene-2 | 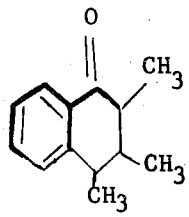 | 53% |
| X | Acetylthiophene | Octene-1 | 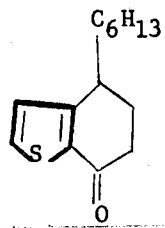 | 34% |

EXAMPLE 11

Phenyl methyl ketone reacted with butadiene in the presence of manganic acetate yields 4-vinyl-alpha-tetralone as the product.

EXAMPLE 12

A 4-n-alkyl-1-tetralone, such as the 4-n-hexyl-1-tetralone prepared in Example 3, is dehydrogenated in the presence of a platinum catalyst. The dehydrogenated product is an alpha-naphthol, i.e.,

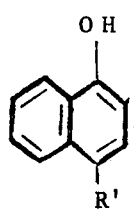

where R' is the alkyl group in the tetralone. The alpha-naphthol can be treated with ammonia to produce an alpha-naphtholamine:

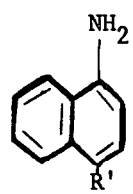

Both the alpha-naphthol and the alpha-naphtholamine are, as indicated, antioxidants. The alpha-naphthol may be converted to alpha-naphthol carbamate, which is an insecticide,

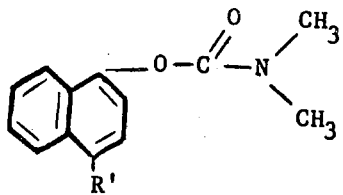

EXAMPLE 13

The product of Example 4 is dehydrogenated and the dehydrogenated product is converted to the carbamate:

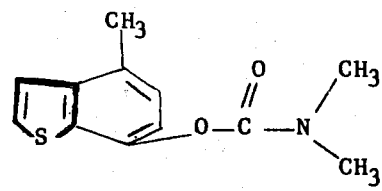

The product is an insecticide.

EXAMPLE 14

In this example, the ketone:

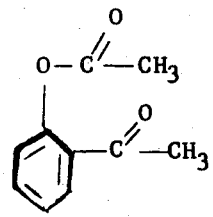

is reacted with the olefin, R' — CH = CH$_2$, where R' is an alkyl group, in accordance with the invention, to give the product:

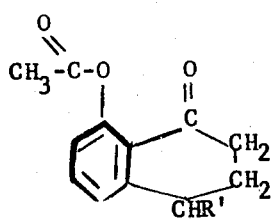

This latter product, upon hydrolysis, gives the compound:

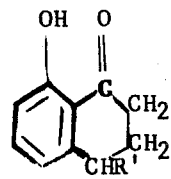

This compound is a chelating agent.

We claim:

1. A method of preparing a polycyclic ketone, said polycyclic ketone having at least two rings, at least one of which is an aromatic ring and the other of which contains, as part of its ring structure, the carbom atom of a keto group, these two rings sharing two carbon atoms as part of their ring structure, said method comprising reacting an olefin selected from the group consisting of ethylene, propylene, n-butylene, isobutylene, pentene, hexene, heptene, octene, allene, butadiene, hexadiene, heptadiene, diisobutenyl, and hexatriene, or an acetylene selected from the group consisting of ethine, allylene, butyne, pentyne, hexyne, heptyne, octyne, butenyne, 1,6-heptadiene-3-yne, and 1,7-octaenyne with an aromatic ketone selected from the group consisting of phenyl methyl ketone, phenyl ethyl ketone, naphthyl methyl ketone, acetylanthracene, acetylpyridine, acetylfuran, and acetylthiophene in the presence of a metal ion of manganese, cerium, or vanadium in a higher valent form, said metal ion being provided by a compound of said metal selected from the group consisting of the acetates, propionates, butyrates, halides, and halogen-substituted acetates, -propionates, and -butyrates of said metal, said reaction being carried out with a concentration of said olefin or acetylene in the range from 0.10 to 5 molar, the amount of said olefin being from 0.25 to 1 mole per mole of metal ion, the amount of said aromatic ketone being at least 1 mole per mole of said olefin or acetylene, the temperature being between 40° and 100° C., and the pressure being such to maintain the reactants in the liquid phase.

2. The method of claim 1 wherein said olefin is ethylene.

3. The method of claim 1 wherein said aromatic ketone is phenyl methyl ketone.

4. The method of claim 1 wherein said metal ion is manganic ion provided by manganic acetate.

5. The method of claim 1 wherein said reaction is carried out in the presence of a solvent for said compound of said metal additional to said olefin, said acetylene, and said aromatic ketone.

6. The method of claim 5 wherein said solvent is acetic acid.

7. The method of claim 6 wherein said olefin is ethylene, said aromatic ketone is phenyl methyl ketone, and said metal ion is manganic ion provided by manganic acetate.

8. The method of claim 6 wherein said olefin is butene-1, said aromatic ketone is phenyl methyl ketone, and said metal ion is manganic ion provided by manganic acetate.

9. The method of claim 6 wherein said olefin is isobutylene, said aromatic ketone is phenyl methyl ketone, and said metal ion is manganic ion provided by manganic acetate.

10. The method of claim 6 wherein said olefin is 1-octene, said aromatic ketone is phenyl methyl ketone, and said metal ion is manganic ion provided by manganic acetate.

11. The method of claim 6 wherein said olefin is propylene, said aromatic ketone is acetylthiophene, and said metal ion is manganic ion provided by manganic acetate.

12. A method of preparing a polycyclic ketone, said polycyclic ketone having at least two rings, at least one of which is an aromatic ring and the other of which contains, as part of its ring structure, the carbon atom of a keto group, these two rings sharing two carbon atoms as part of their ring structure, said method comprising reacting ethylene with phenyl methyl ketone in the presence of manganic ion provided by manganic acetate and in the presence of acetic acid as a solvent for said manganic acetate, said reaction being carried out with a concentration of said ethylene in the range from 0.10 to 5 molar, the amount of said ethylene being from 0.25 to 1 mole per mole of said manganic ion, the concentration of said phenyl methyl ketone being at least 1 mole per mole of said ethylene, the temperature being between 40° and 100° C., and the pressure being such to maintain the reactants in the liquid phase.

* * * * *

PO-1050
(5/69)

UNITED STATES PATENT OFFICE
CERTIFICATE OF CORRECTION

Patent No. 3,860,612      Dated January 14, 1975

Inventor(s) EL AHMADI I. HEIBA and RALPH M. DESSAU

It is certified that error appears in the above-identified patent and that said Letters Patent are hereby corrected as shown below:

Column 5, line 34      "Aceylenes" should be --acetylenes--.

Column 5, line 47      After "polycyclic" insert --aromatic--.

Signed and sealed this 1st day of April 1975.

(SEAL)
Attest:

RUTH C. MASON
Attesting Officer

C. MARSHALL DANN
Commissioner of Patents
and Trademarks